Aug. 11, 1953 M. CAMRAS 2,648,590

MAGNETIC RECORDER

Filed Dec. 6, 1947 5 Sheets-Sheet 1

Inventor
MARVIN CAMRAS by The Firm of Charles W. Hills Attys.

Inventor
MARVIN CAMRAS by The Firm of Charles W. Hills Attys.

Inventor
MARVIN CAMRAS by The Firm of Charles W. Hills

Attys.

Aug. 11, 1953

M. CAMRAS 2,648,590

MAGNETIC RECORDER

Filed Dec. 6, 1947

5 Sheets-Sheet 4

Inventor
MARVIN CAMRAS by The Firm of Charles Hills Attys.

Aug. 11, 1953 M. CAMRAS 2,648,590
MAGNETIC RECORDER
Filed Dec. 6, 1947 5 Sheets-Sheet 5
FIG. 13.
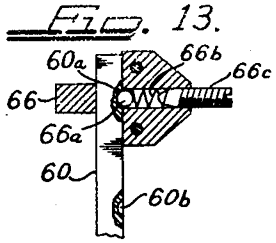
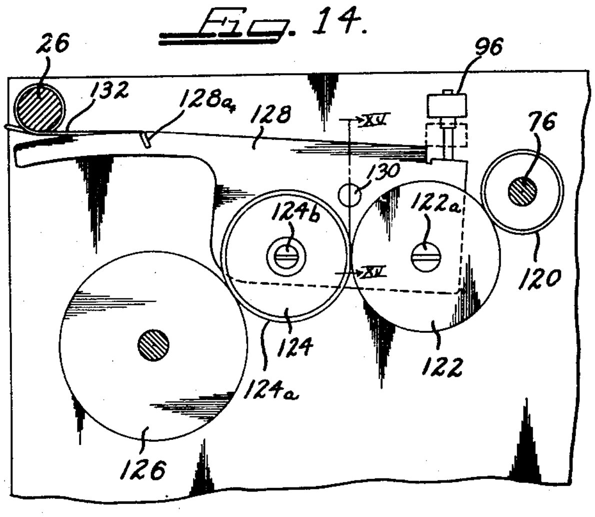
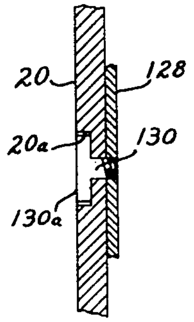
FIG. 15.
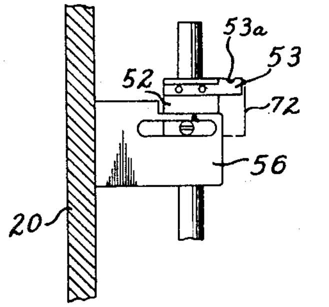
FIG. 16.
Inventor
MARVIN CAMRAS
by The Firm of Charles W. Hills Attys.

Patented Aug. 11, 1953

2,648,590

UNITED STATES PATENT OFFICE 2,648,590

MAGNETIC RECORDER

Marvin Camras, Chicago, Ill., assignor to Armour Research Foundation of Illinois Institute of Technology, Chicago, Ill., a corporation of Illinois Application December 6, 1947, Serial No. 790,193

14 Claims. (Cl. 346—74)

My invention relates to drive mechanism for magnetic recorders and more particularly to an improved drive mechanism suitable for use in a magnetic recorder or the type wherein a removable cartridge or magazine containing a lengthy recording medium is inserted or removed from the mechanism.

In magnetic recording devices it is frequently desirable to provide a mechanism whereby a simple operation permits the medium to be removed or added thereto, thus enabling the user quickly to reproduce different intelligences or to supply fresh medium for the purpose of recording a continuing intelligence. Moreover, it is desirable that this addition or removal of the medium-containing cartridge or magazine be accomplished in a simple and direct fashion without the need to unwind and thread the medium through a complicated series of capstans, guide wheels, etc. Furthermore, a rewind mechanism capable of rewinding the medium at high speed without unduly tending to break the medium is highly desirable to the end that the time lost in this operation be minimized.

In magnetic recorders of the type intended for use with removable cartridges or magazines, it is further desirable to provide a mechanism suitable for use with a cartridge containing only the spool or reels upon which the medium is wound and having no other elements, to the end that cartridges or magazines of minimum cost may be used.

It is accordingly a general object of the present invention to provide an improved magnetic recorder suitable for use with a cartridge or magazine.

Further, it is an object of the present invention to provide an improved magnetic recorder of the type wherein a cartridge or magazine containing the medium may be readily and easily inserted without threading the medium over guide pulleys or other mechanism.

Further, it is an object of the present invention to provide an improved magnetic recorder wherein the medium is automatically distributed over the axial length of the reels or spools in the cartridge or magazine.

A further object of the present invention is to provide an improved magnetic recording mechanism which is operable to wind the record medium in either direction to permit recording or reproducing and rewinding as well, and which has interlocking elements to free the medium of the transducer head during rewind.

It is yet another object of the present invention to provide an improved magnetic recorder wherein the medium may be rewound at high speed with minimum tendency toward breakage.

Still another object of the present invention is to provide an improved magnetic recorder capable of receiving medium containing cartridges or magazines containing only the spools or reels upon which the medium is wound.

My invention further resides in the features of construction, combination and arrangement whereby an improved magnetic recording mechanism is provided which is simple and inexpensive in construction and reliable in operation, to the end that a unit of maximum utility is provided.

The novel features of my invention are set forth with particularity in the appended claims. My invention itself, however, both as to its organization and method of operation, may best be understood by reference to the following description taken in connection with the accompanying drawings, in which:

Figure 13 is a fragmentary cross-sectional view through axis XIII—XIII, Figure 2, but showing the elements in position corresponding to the retraction of the head and with parts in elevation;

Figure 14 is a fragmentary cross-sectional view through the axis XIV—XIV, Figure 2, showing the drive mechanism for the take-up spool hub;

Figure 15 is an enlarged fragmentary cross-sectional view through axis XV—XV, Figure 14; and Figure 16 is a fragmentary side elevational view showing the guide attached to the carriage to guide the medium in its travel thereover.

Figures 1, 2:
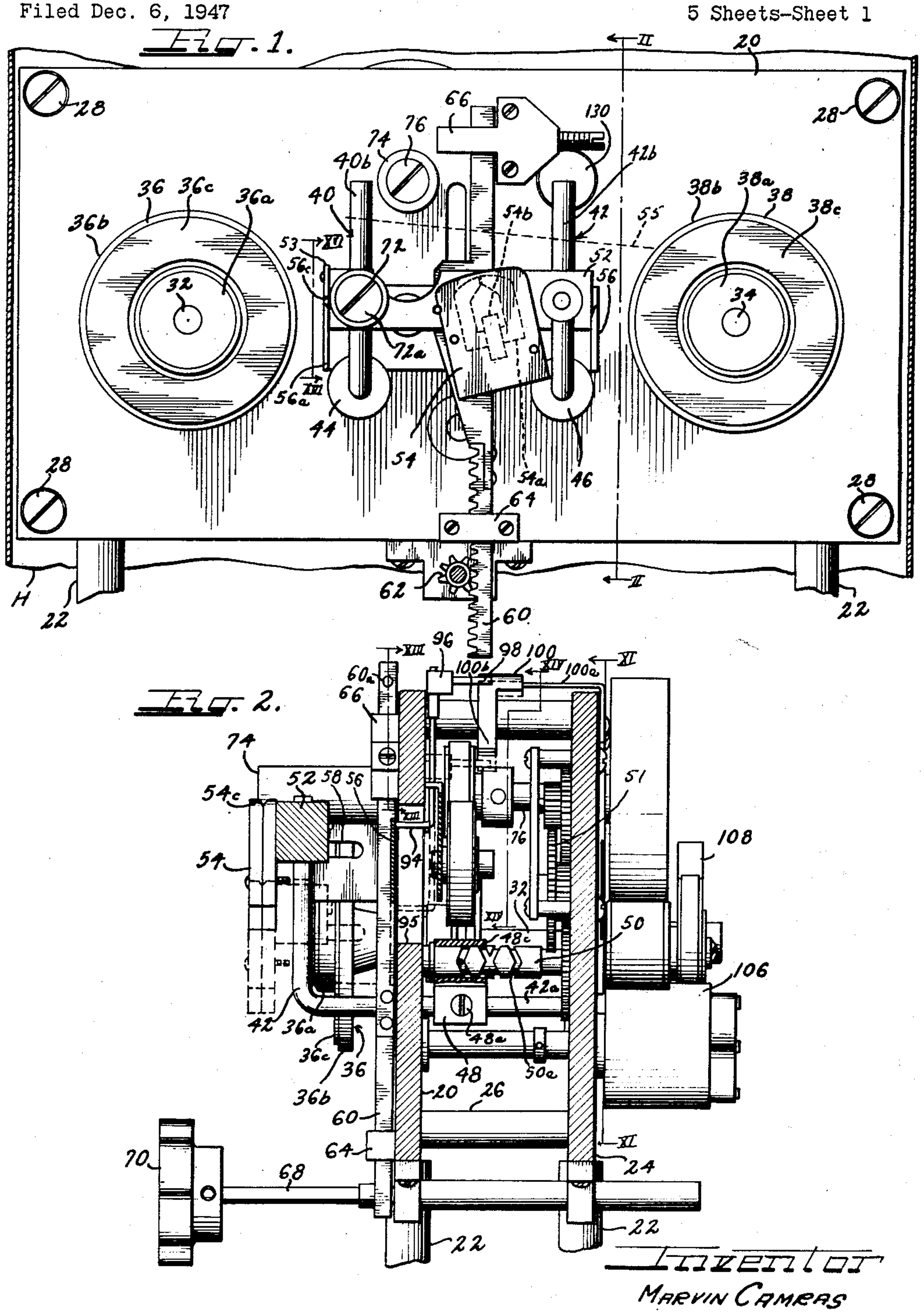
Figure 1 is a front elevational view of a mechanism embodying the principles of the present invention, with the housing broken away to expose the operative elements.
Figure 2 is a side cross-sectional view taken through the axis II—II, Figure 1, with the housing removed to show the operative elements.
Figure 5:
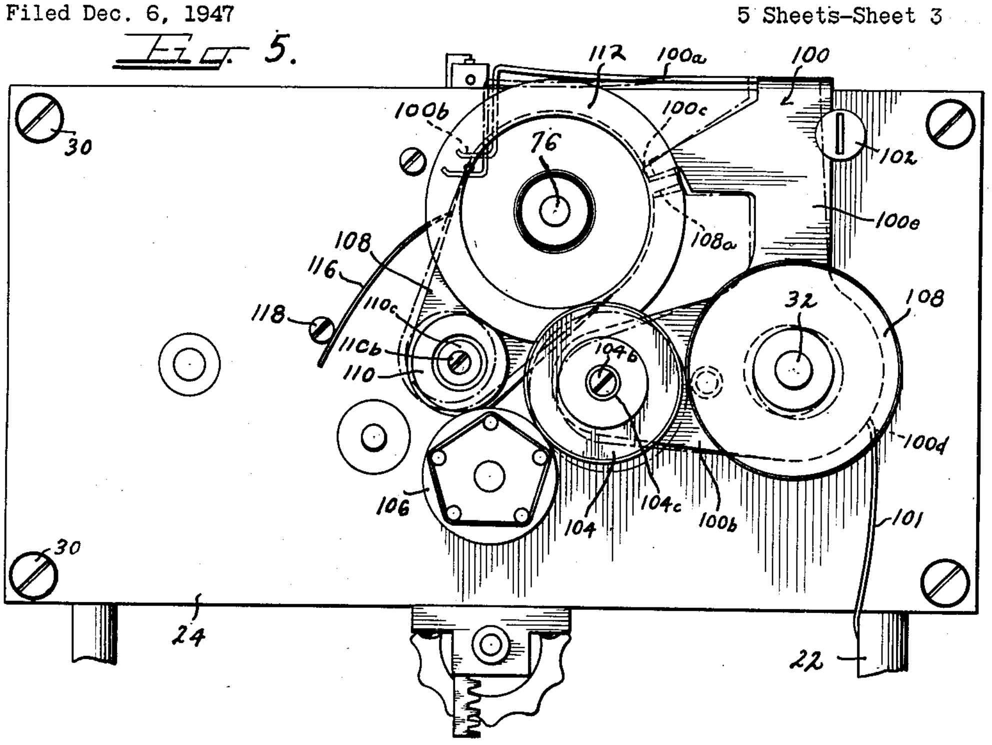
Figure 5 is a rear elevational view of the mechanism of Figure 1 and with the housing removed.
Figure 10:
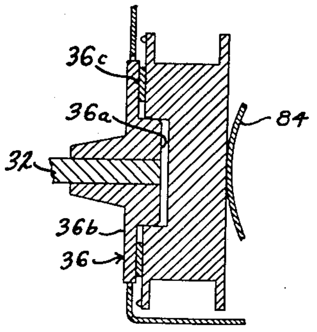
Figure 10 is a cross-sectional view through the axis X—X of Figure 4, showing a spool received on one hub portion of the mechanism.

Referring now to the mechanism of Figure 1, there is shown at 20 a front panel which is supported upon the legs 22 and which is held in engagement with the rear panel 24 (Figure 2) by the sleeves 26 which receive the screws 28 extending through the panel 20. As shown in Figure 5, the rear panel 24 is held to the sleeve 26 by the screws 30. A pair of shafts 32 and 34 extend forwardly from the panel 20 and receive the hubs or collars 36 and 38 which are press-fitted thereon and engage the spool upon which the lengthy record medium is wound. Figure 10 is a cross-sectional view showing the shaft 32 and the hub 36.

The construction of the hubs 36 and 38 may best be seen by the cross-sectional view of Figure 2 which shows the hub 36 in elevation. As indicated, this hub includes a forwardly extending cylindrical hub portion 36*a* of smaller diameter than the flange portion 36*b* formed integrally therewith. In addition, an annular friction member 36*c* is sustained by an adhesive to the front portion of the flange section 36*b*. The hub 38 includes a flange portion 38*b*, a forwardly extending cylindrical portion 38*a* and an annular friction member 38*c* (Figure 1) in like fashion. As will be described in further detail hereafter, the magazine contains a pair of spools, each of which has a central opening to receive the cylindrical portions 36*a* and 38*a* of the hubs 36 and 38 and which has side portions to engage the annular friction members 36*c* and 38*c* to drive or oppose the rotation of the spools in accord with the operation of the mechanism.

Figure 4:
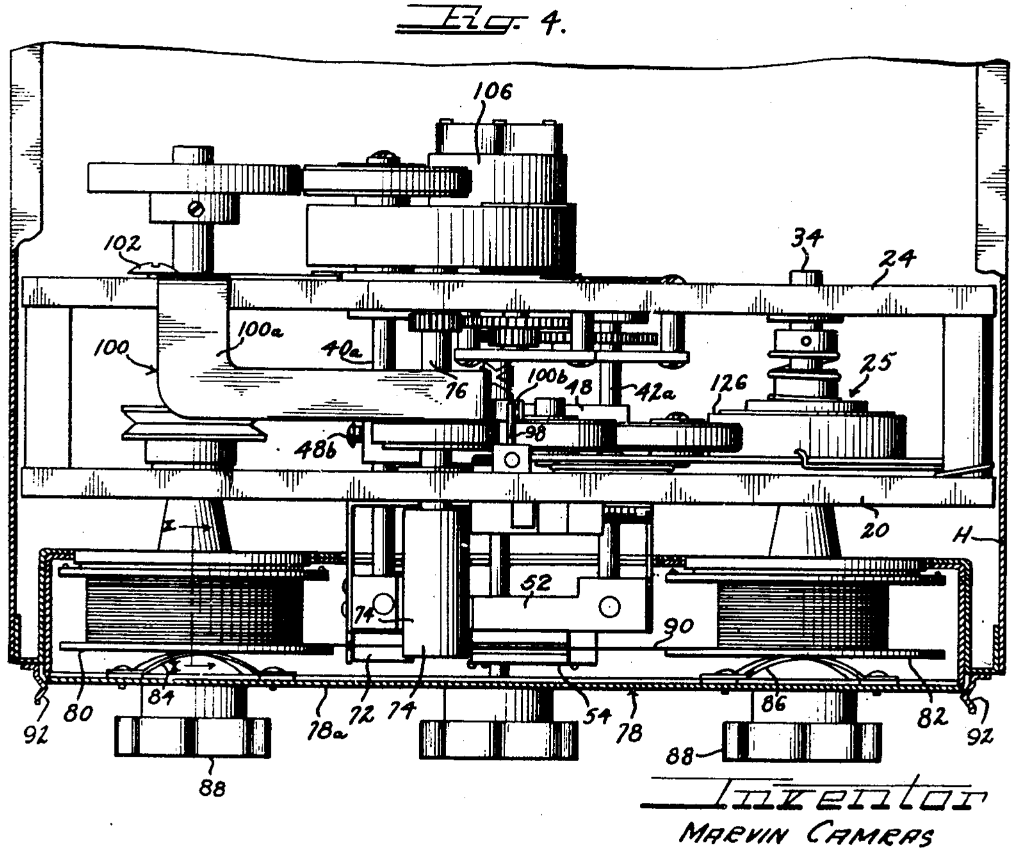
Figure 4 is a top plan view of the mechanism of Figures 1 and 2 with the housing broken away to show the magazine and operating elements.
Figure 8:
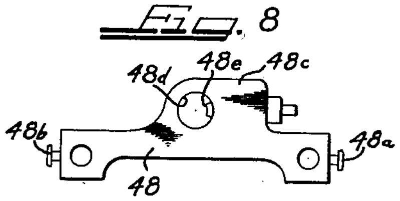
Figure 8 is a front elevational view of the bridge which imparts inward and outward movements to the retractable carriage.

A pair of hook-shaped rods 40 and 42 of circular cross-section are mounted with their lengthy legs 40*a* and 42*a* extending through base bearings 44 and 46 in the panel 20. A bridge 48 extends between these rods as is best seen in the views of Figures 2 and 4. This bridge is held against the portion 42*a* of rod 42 by forcing screw 48*a*, and against the portion 40*a* of rod 40 by forcing screw 48*b*. The member 48 has an upstanding dome 48*c* which has a cylindrical opening 48*d* to receive the shaft 50 which extends in a direction normal to the plane of the panel 20. The shape of bridge 48 is best seen in the view of Figure 8.

The shaft 50 has a groove 50*a* which is spiraled to define a double helical path. The member 48 has an inwardly extending cam follower 48*e* (Figure 8) which extends inside the opening formed in the member 48 to receive shaft 50 and which rides in the groove 50*a*. Thus, as the shaft 50 is rotated, the member 48 is driven axially thereof by the cam follower 48*e* which moves first in one direction at a uniform linear velocity and then moves in the reverse direction at like velocity, repeating this cycle of operation once for every four revolutions of the shaft 50.

Figure 9:
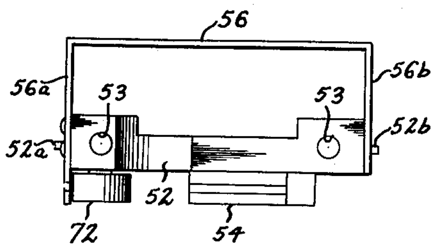
Figure 9 is a top plan view of the carriage portion of the mechanism.

A carriage 52 extends between the legs 40*b* and 42*b* of the shafts 40 and 42. This carriage has openings 53 (Figure 9) which slidably receive these shafts and support the head 54 and the pinch wheel 72. The carriage 52 is further sustained upon the U-shaped bar 56 which is best seen in the view of Figure 9 and which bears elongated slots 58 (Figure 2) at its opposite end portions 56*a* and 56*b*. The carriage 52 has a pair of pins 52*a* and 52*b* which are received in the slots 58 to cause the carriage 52 to partake of the up-and-down movement of the support bracket 56. These slots are elongated to permit the carriage 52 to partake of the horizontal movement of the arms 40 and 42 without causing movement to be imparted to the U-shaped support bracket 56 which is mounted adjacent the panel 20.

The vertical movements of the carriage 52 are controlled by the rack 60 and the pinion 62 (Figure 1). The former is received in the spaced guides 64 and 66 which slidably received that member. The pinion 62 is attached to the shaft 68 (Figure 2) which in turn is rotated by knob 70. The U-shaped support bracket 56 is held in engagement with the rack 60 by a notched slot portion which faces the panel 20 to receive bracket 56 as shown in Figure 2. If desired, the U-shaped support 56 may be attached to the rack 60 by welding or other suitable means.

The head 54 is mounted upon the carriage 52 by suitable support screws (not shown) and may be any one of several types well known in the art. For example, this head may include a U-shaped core 54*a* having leg portions defining confronting pole pieces at the upper portion of the head 54 and which has a winding 54*b* encircling the bottom portion of the core. The confronting pole pieces of the core 54*a* are mounted against the bottom of the groove 54*c* (Figure 2) which receives the lengthy wire constituting the magnetizable record medium.

When it is desired to impart variations in the degree of magnetization of the medium as it passes across the head 54, electric current varying with time in accordance with the time variations in the intelligence to be recorded is impressed across the coil 54*b* to vary the intensity of the magnetic field between the confronting pole pieces of the core portion 54*a* in accordance with the time variations of the intelligence. As the medium rides over the head 54, corresponding variations in the degree of magnetization are imparted to the medium to magnetize the medium along its length in accordance with the time variations of the intelligence. During reproduction, the medium is drawn over the head 54 to vary the flux in the core 54*a* with time in accordance with the variations in the degree of magnetization along the length of the medium. These time variations in magnetic flux cause induced voltages in the coil 54*b* which may be amplified to reproduce the original intelligence.

In addition to the head 54, the carriage 52 supports the pinch wheel 72. This wheel is mounted upon the carriage 52 by the screw 72*a* and is free to rotate relative thereto.

A capstan 74 is mounted upon the panel 20 and is sustained upon the shaft 76 which extends through panels 20 and 24. As shown in Figure 4, this capstan is relatively lengthy and is of sufficient length to bear against the medium passing over the head 54 even when the latter is in the two extremes of horizontal movement caused by the bridge 48.

In accordance with one feature of the present invention, the capstan 74 is covered with rubber or similar material to accomplish effective gripping action against the medium. Since the carriage 52 is continuously moving in direction transverse to the panel 20, the point at which the medium rides on the surface of capstan 74 is continuously changing, and uniform wear over the entire surface is achieved.

Figure 3:
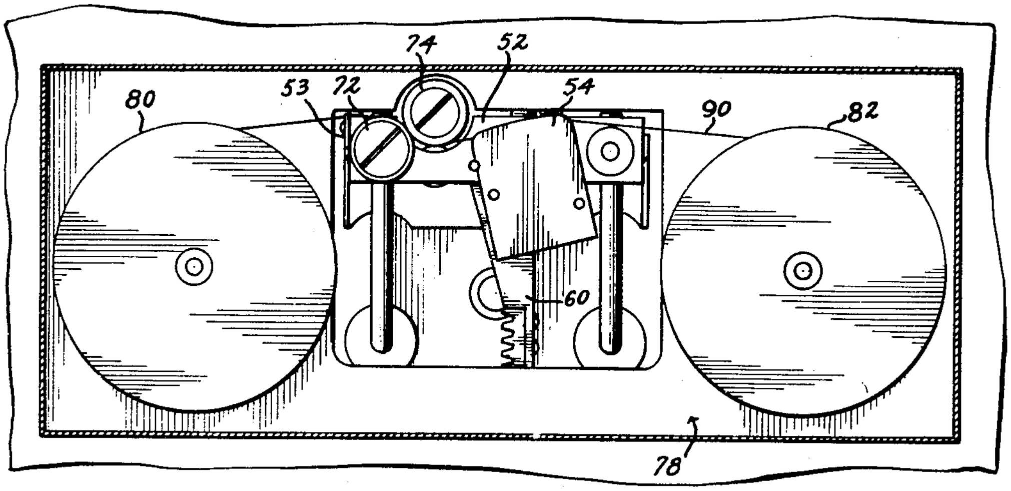
Figure 3 is a front elevational view of the mechanism of Figure 1 but with a magazine containing a pair of spools and a lengthy recording medium wound thereon inserted, and with the head in the operating position.

Figures 3 and 4 show a magazine 78 in operative engagement with the structure of Figure 1. This magazine includes a pair of spaced spools 80 and 82 which are spaced from each other by distance corresponding to the spacing of shafts 32 and 34 and are shaped to be received upon the collars 36 and 38. The shape of the spools 80 and 82 is best seen in the view of Figure 10 which shows a cross-sectional view through the axis of X—X (Figure 4). Each of these spools is urged against the friction surface of the corresponding collar 36 or 38 by the bowed resilient members 84 and 86, respectively. These are each mounted on the forward panel 78a of the magazine 78 and urge the spools rearwardly relative to the panel 78a and against the collars 36 and 38. The magazine 78 is provided with a plurality of knobs 88 to permit insertion and removal thereof to and from the recess defined by the housing H.

If it is desired to minimize the storage space required by magazine 78, indentations may be provided in the panel 78a to permit removal of the magazine from the recorder. The knobs 88 can thereby be eliminated.

It will be evident from the foregoing that the magazine 78 consists only of a housing portion containing a pair of medium supporting spools or reels 80 and 82 upon which the medium 90 is wound, and a pair of bowed springs 84 and 86 to urge these spools against the rear wall thereof. When the magazine is inserted, the spools 80 and 82 are supported from the hubs 36 and 38, Figure 1, as shown in Figure 10. Thus a simple and inexpensive magazine containing no shafts, capstans, electromagnetic transducer heads, or like equipment, may be used with the apparatus of the present invention, and the expense associated with the use of magazines is minimized.

If desired, resilient snap elements 92 may be mounted on the forward portion of the housing H to bear against the magazine 78 to urge the magazine into engaged relationship with this housing. The bias of these elements is overcome to insert or remove the magazine.

A lengthy magnetic record medium 90 of wire or the like extends between the spools 80 and 82, as will be evident from Figures 3 and 4. This medium leaves these spools at the top portions thereof and thus rides free of the head 54 when the latter is in the retracted position shown in Figure 1 as indicated by the dashed line 55 which indicates the position of the medium when free of head 54 and pinch wheel 72. It will further be evident from Figure 1 that the medium 90 rides beneath the capstan 74 when the pinch wheel 72 is in the retracted position of that figure. Consequently, the magazine 78 may be inserted in the mechanism without requiring the medium 90 to be threaded over the capstan 74, the pinch pulley 72, or the head 54, and may be inserted into the housing H by the simple operation of grasping the knob 88 and pushing the magazine into position.

When the rack 60 is shifted upwardly by rotation of knob 70, the carriage 52 is raised to the position indicated in Figure 3. In this position, the head 54 and the pinch wheel 72 bear against the medium 90 and cause the latter to ride on the periphery of the capstan 74. Moreover, the pinch wheel 72 engages the periphery of the capstan 74 to increase the frictional engagement between the medium 90 and the capstan, thus causing the medium to partake of the movement of the capstan and move with a linear velocity corresponding to the angular velocity thereof.

The capstan 74 is rotated simultaneously with shaft 50 by means to be described in further detail hereinafter. The former imparts linear velocity to the medium 90, whereas the latter imparts movement on a horizontal axis to the bridge 52 and hence the pinch wheel 72 and the head 54. This causes the medium 90 to be wound uniformly on the take-up spool and to provide a uniform distribution of that medium thereon. In addition, this equalizes the engagement of medium 90 with capstan 74 over the length of that capstan to cause uniform wear thereof. The capstan 74 is made of sufficient length to receive the medium 90 in all positions of the carriage 52.

In addition to controlling the vertical position of the carriage 52 to retract the pinch wheel 72 and the head 54, the rack 60 also controls the movements imparted to the medium 90. To this end, the rack 60 is attached to the arm 94 (Figure 2) which extends through the window 95 of panel 20 and upwardly to sustain connector 96. A pin 98 is attached to connector 96 and extends rearwardly to engage the bent-over portion of the shiftable control plate 100.

Figure 11:
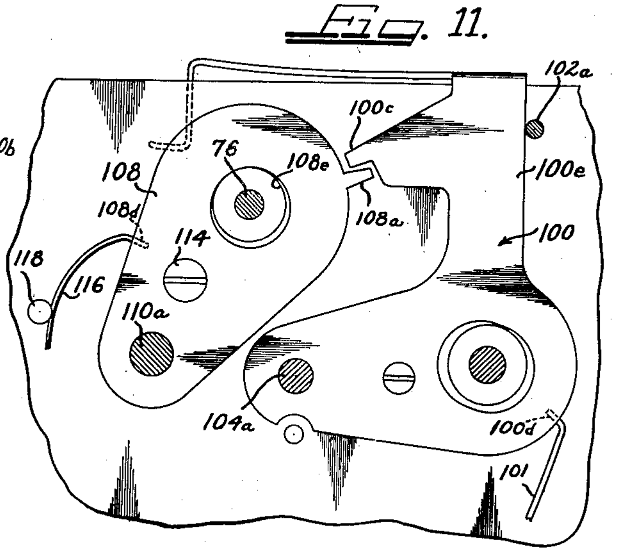
Figure 11 is a fragmentary cross-sectional view through the axis XI—XI, Figure 2, and showing the structure of the operative elements.

The construction and operation of the shiftable control plate 100 can best be understood by reference to the views of Figures 2, 4, 5 and 11. As will be evident from Figures 4 and 5, the shiftable support plate 100 has a horizontally disposed portion 100a which defines an arm extending parallel to the plane of the panel 20 and which at its remote end contains the hooked portion 100b. It is this portion that is engaged by the pin 98, Figure 4. The shiftable plate 100 further has a vertically disposed portion 100e which is held against the outward surface of rear panel 24 by the overlapping head portion of the screw 102. The shank portion 102a, Figure 11, of this screw forms a stop member against which the plate 100 rests. As is best shown in Figure 11, the portion 100b of the shiftable plate 100 supports the selectively engageable friction drive wheel 104 which is pivotally supported by the shaft 104a which receives the screw 104b (Figure 5) which screw holds the inner race portion 104c of the bearing for wheel 104.

From the foregoing it will be evident that as the hook portion 100b of the plate 100 is engaged by the pin 98 and shifted downwardly, the wheel 104 is shifted to the position of the dashed lines of Figure 5 and thereby shifts into pinching relationship with the drive wheel 106 and the driven wheel 108. The latter wheel is attached to the shaft 32 upon which hub 36 is mounted and thus acts to rotate that hub when the plate 100 is tilted and the drive wheel 106 is rotated. As will be described in further detail hereafter, the engagement of wheel 104 causes rewinding rotations of the spool 80 (Figure 4).

A supplementary shiftable support plate 108 (Figures 5 and 11) shifts the wheel 110 into and out of pinching relationship with the drive wheel 106 and the flywheel 112. The latter is connected to the shaft 76 upon which the capstan 74 is mounted.

The plate 108 is of teardrop shape and has an extending pin 108a positioned to engage the corresponding extension 100c of the plate 100. The plate 108 has a circular opening 108e which clears the shaft 76 as the plate is rotated about the pivot formed by screw 114. Screw 114 is received in panel 24. The wheel 110 is supported from the shaft 100a which is mounted upon the plate 108 and is held in engagement with this shaft by the screw 110b (Figure 5) which is received therein and sustains the inner race 110c of the bearing forming the inner portion of the wheel 110.

As shown in Figures 5 and 11, the plate 108 is provided with an opening 108d which receives the piano wire spring 116. At its opposite end the spring 116 bottoms against the head of screw 118 which is received in the panel 24. As will be evident from the view of Figure 11, this spring acts to bias plate 108 in the counter-clockwise direction as seen in that figure and thereby causes wheel 110 to tend to pinch between the wheels 106 and 112. When this bias is overcome by downward motion of the extension 100c resulting from the depression of the hook portion 100b of the plate 100, the wheel 110 is shifted out of engagement with the drive wheel 106 and the flywheel 112, and the capstan 74 rides free of rotations of drive wheel 106.

The plate 100 is provided with a recess 100d (Figures 5 and 11) to receive the piano wire spring 101. This spring is wrapped about the support post 22 at its bottom end and acts to bias the plate 100 to the position of the solid lines of Figure 5, thereby causing the hook 100b to tend to rise upwardly and to disengage the wheel 104.

From the foregoing it will be evident that when the pin 98 is depressed, the capstan 74 rides free of any motion imparted to the drive wheel 106, and the friction wheel 104 swings into pinching relationship with wheels 106 and 108 to drive the collar 36.

As will be evident from Figure 2, the pin 98 rides free of the hook portion 100b of the plate 100 when the head 54 is shifted to the upward or operating condition as shown in the solid lines of that view. Thus the capstan is then energized and operates to drive the medium 90. However, when the head 54 is retracted to the position shown in the dashed lines of Figure 2, the pin 98 engages the hooked portion 100b and rotates plate 100 to a degree sufficient to cause the extension 100c to engage the pin 108a and shift the friction wheel 110 out of engagement with the flywheel 112, thereby releasing capstan 74.

In order to hold the rack 60 in the retracted position against the action of the biasing springs 116 and 101, the rack 60 is provided with a cup-shaped openings 60a, Figure 2. This opening receives the ball 66a, Figure 13, which rides against the spring 66b which in turn is bottomed against the adjusting screw 66c. Thus, as the knob 70 is rotated to shift the head 54 to the retracted position of the dashed lines of Figure 2, the ball 66 rides in the cup 60a and holds the rack 60 as shown in Figure 13, thus sustaining wheel 110 in the disengaged position and holding flywheel 112 free of any driving torque from wheel 110.

A similar cup-shaped opening 60b is provided in the rack 60 to receive the ball 66a when that rack is in position shown in Figure 3 where the head 54 engages medium 90. This opposes any tendency of the medium 90 to shift the head 54 and the associated mechanism toward the retracted position.

Figure 12:
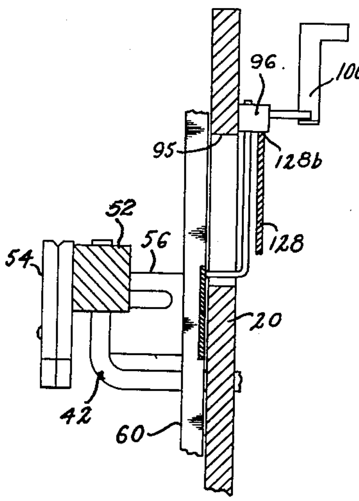
Figure 12 is a fragmentary cross-sectional view like Figure 2 but showing the carriage in the further retracted position to rewind the medium.

In the view of Figure 12, the elements are shown in a further retracted position wherein the rack 60 is held against the bias of springs 116 and 101 to a position beyond that corresponding to the position wherein ball 66a rides in cup 60a. In this position the lower edge of the connector 96 (Figure 2) engages the upper edge 128b of the plate 128 and tilts that plate against the bias of spring 132 to swing wheel 122 to the position of the dotted lines of Figure 14, thereby freeing the hub 34 from the flywheel 112 and permitting the spool 82 (Figure 3) to accelerate rapidly during rewind.

When the rack 60 is held in the position of Figure 12, the plate 100 is tilted with sufficient force to establish a driving engagement between the drive wheel 106 and the shaft 32 which supports the spool 80 (Figure 3). This imparts rewinding rotations to the spool 80 to rewind the medium from spool 82.

The drive mechanism for the take-up spool hub 34 may best be understood by reference to Figure 14 which is a fragmentary cross-sectional view through the axis XIV—XIV (Figure 2). As shown in this view, a friction wheel 120 having a tire of rubber or the like is mounted upon the capstan shaft 76 in alignment with the friction drive wheels 122 and 124. The latter drive wheel bears against the wheel 126 which is received upon the shaft portion of the hub 34. The wheel 124 has a tire 124a, and the wheels 122 and 126 have no tires. When the capstan shaft 76 rotates in the clockwise direction, as seen in Figure 14, the wheel 126 is rotated in the counter-clockwise direction, and the medium 90 is wound upon the spool 82 (Figure 3) since the spool 82 is rotated in the clockwise direction as seen in that figure. Since clockwise rotation of shaft 76, as seen in Figure 14, corresponds to winding the medium from the spool 80 to the spool 82, the spool 82 is rotated in direction corresponding to the motion imparted by the capstan to the medium.

The friction drive wheels 122 and 124 are supported from the shiftable support plate 128 by the screws 122a and 124b which ride on the inner race portions of the bearings formed on the inner portions of these wheels. The plate 128 is pivotally supported from the front panel 20 by the collar 130 which is best seen in the cross-sectional view of Figure 15. As will be seen in the view of Figure 15, the collar 130 rides in an opening 20a of the front panel 20 and permits tilting movement of the plate 128. The head portion 130a of collar 130 holds the plate 128 against the panel 20.

The plate 128 is biased in the clockwise direction about the collar 130, as seen in Figure 14, by the spring 132 which consists of piano wire looped about the collar 26 and which bears at one end against the edge of the panel 20 and at the other end against the recess 128a provided in the upper portion of the plate 128.

When the plate 128 is in the free position shown in Figure 14, the spring 132 biases the wheels 122 and 124 into engaging relationship with the wheels 120 and 126, thereby causing the capstan shaft 76 to drive the take-up spool shaft 34. However, when the member 96 swings down to the lowered position shown by the dotted lines of Figure 14, by retraction of the rack 60, the plate 128 is tilted against the bias of spring 132 and the wheels 122 and 120 are swung out of engaging relationship to discontinue the driving action.

The plate 128 is positioned relative to the member 96 to cause disengagement of the driving action of the shaft 34 when the rack 60 is retracted beyond the point that the ball 66a (Figure 13) rides in the cup 60a.

From the foregoing description it will be evident that knob 70 may be first rotated to retract the head 54 and disengage the drive mechanism for the capstan 74, and then a magazine may be inserted or removed from the unit without threading the medium 90 across the head, capstan, or other elements. However, after inserting a magazine, the knob 70 may be rotated until the ball 66a rides in the cup 60b and holds the pinch wheel 72 and the head 54 against the medium 90. In this condition, the drive wheel 106 rotates the capstan 74 by reason of the engagement of friction drive wheel 110 with the flywheel 112 to impart linear velocity to the medium 90. Moreover, the take-up spool 82 is yieldingly driven by the friction drive wheels 122 and 124 (Figure 14) which rotate the hub 38a to drive that spool and maintain the medium 90 taut between the capstan 74 and the spool 82. During this operation the entire carriage 52 is shifted forwardly and backwardly by the operation of the member 48 which rides on the slot of the shaft 50 to distribute the medium 90 evenly over the axial length of the spool 82.

When the medium 90 has been completely transferred from the spool 80 (Figure 3) to the spool 82, the medium may be rewound by shifting the rack 60 downwardly beyond the point where the ball 66a rides in the cup 60a. In this condition, the plate 128 is tilted to free spool 82 from the flywheel 112, and the plate 100 is tilted to discontinue the driving engagement of the capstan 74. Moreover, in this condition, the plate 100 shifts to cause the friction drive wheel 104 to ride in driving engagement between the wheels 106 and 108 and thereby impart take-up rotation to the spool 80 and cause the medium 90 to be wound thereon.

The gear train 51 (Figure 2) interconnects the capstan shaft 76 with the shaft 50 which defines the groove 50a. This gear train steps down the rotation of the shaft 50 relative to the shaft 76 to cause the head or carriage 52 to ride in and out at a slow rate compared to the rotation of the spool 82.

As shown in Figure 16, a guide member 53 is attached to carriage 52 by suitable screws or similar means and extends forwardly therefrom to define a notch 53a to receive the medium 90 and guide that medium relative to the head 54, thereby avoiding any tendency of the medium to ride free of the head.

It will be noted that when the carriage 52 is shifted to the further retracted position wherein medium 90 is rewound from spool 82 to spool 80 that the shaft 50 is not rotated, and hence there is no tendency for the carriage 52 to shift axially of the shafts 34 and 32. However, the medium rewinds uniformly on the spool 80 since it is uniformly distributed across the spool 82, and there are no elements in engagement therewith to interfere with the natural tendency of the medium to wind upon spool 80 in axial alignment with the point on spool 82 from which it is being unwound.

It will be further observed that when the rewind action takes place, there are no members in contact with the record medium 90 other than the spools 80 and 82. The head 54, the capstan 74, the pinch wheel 72, and the guide 53 are all in spaced positions relative to medium 90 and have no opportunity to catch thereon or otherwire to engage the medium to tend to cause breakage thereof. Consequently, it is possible to design the drive mechanism to rotate the spool 80 during rewind at a relatively high velocity without danger of breakage, thereby to minimize the time required for rewinding the medium while at the same time avoiding breakage.

The clutch assembly, indicated generally at 25 (Figure 4) acts as a further yielding drive element between drive wheel 106 and spool 82. This clutch may, for example, consist of an annular friction plate spring biased against the face of the wheel 126, the latter being mounted to ride free of the shaft 34.

Figure 6:
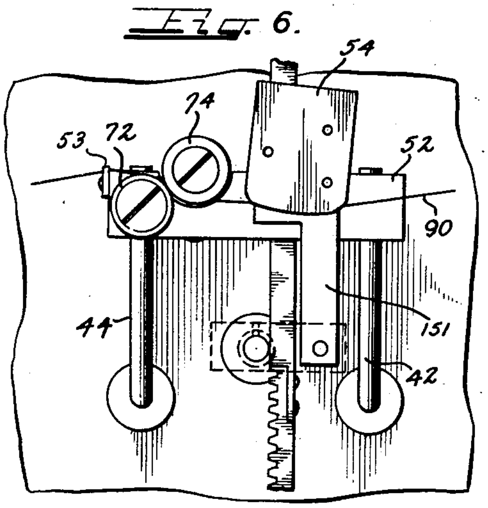
Figure 6 is a fragmentary front elevational view of an alternative embodiment of the present invention.
Figure 7:
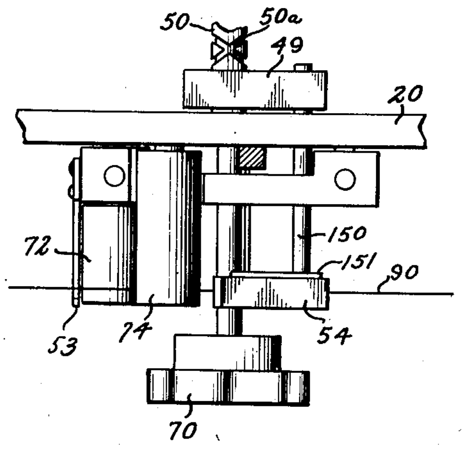
Figure 7 is a fragmentary top plan view of the embodiment of Figure 6.

In the alternative embodiment of the present invention shown in Figures 6 and 7, the rods 42 and 44 which support the carriage 52 are not shifted inwardly and outwardly. Instead, the head 54 is mounted upon the rod 150 (Figure 7) which passes through an opening in the front panel 20 and is received on the member 49, which member includes cam following elements to ride on the groove 50a of the shaft 50 to shift the head 54 and guide medium 90 for level winding action. Head 54 is sustained from rod 150 by the arm 151.

It will be further evident from the view of Figure 7 that the pinch wheel 72 is constructed of elongated shape similar to the capstan 74. Thus, as the head 54 is shifted inwardly and outwardly by the rod 150, the capstan 74 and pinch wheel 72 receive the medium 90 at different points along their axes as that medium follows movement of the head 54. The capstan 74 or the pinch wheel 72, or both, may have rubber tires since the wear is distributed over their entire axial lengths by the movement of the medium 90.

In the foregoing specification and the accompanying claims I have used the term "spool" to designate the devices which engage the hubs 32 and 34 and rotate with the motions of the medium 90. It is my intention to cover generically all spools, reels, pulleys and similar devices useful for this purpose.

I have used the term "magnetic recorder" in this specification and appended claims to designate mechanism operable either to record an intelligence upon a magnetic or similar medium, a mechanism to reproduce the intelligence contained on such a medium, or mechanism operable to accomplish both of these functions. Inasmuch as the mechanical problems encountered in all of these instruments are identical, the principles of the present invention may be applied thereto, irrespective of the particular arrangement thereof.

While I have shown particular embodiments of my invention, it will of course be understood that I do not wish to be limited thereon since many modifications both in the elements employed and the cooperative structures disclosed may be made without departing from the spirit and scope of my invention. I, of course, contemplate by the appended claims to cover any such modifications as fall within the true spirit and scope of my invention.

I claim as my invention:

1. The combination in a magnetic recorder of a pair of spaced spool-receiving hubs to engage spools between which a lengthy record medium extends; a first wheel disposed between said hubs and spaced from said medium; elements including a carriage mounted for shifting movement toward and away from said medium as it extends between said spools; a second wheel mounted on said carriage to engage said medium and urge said medium against said first wheel when said carriage is positioned close to said medium; a head mounted on said carriage to receive said medium when said second wheel bears thereagainst, and means to rotate one of said wheels to impart velocity to said medium.

2. The combination in a magnetic recorder of a pair of spaced spool-receiving hubs to engage spools between which a lengthy record medium extends; a capstan disposed between said hubs and spaced from said medium; a carriage; a movable mechanism adapted to operate upon said carriage for shifting movements toward and away from said medium; a pinch wheel mounted on said carriage to bear against said capstan to urge said medium against said capstan when said carriage is moved toward said medium; and a head mounted on said carriage to receive said medium when said pinch wheel engages said medium.

3. The combination in a magnetic recorder of a pair of spaced spool-receiving hubs to engage spools between which a lengthy record medium extends; mechanism to impart take-up rotations to one of said hubs to cause said medium to be wound on the spool engaged thereby; a carriage having a pair of spaced openings; a track comprising two spaced members received in said openings to support said carriage for movements toward and away from said medium; and mechanism operable to shift said track members in the axial direction relative to said one hub uniformly to distribute said medium across said spool as it is wound thereon.

4. The combination in a magnetic recorder of a pair of spaced spool-receiving hubs to engage spools between which a lengthy record medium extends; mechanism to impart take-up rotation to one of said hubs to cause said medium to be wound on the spool engaged thereby; a carriage having a pair of spaced openings; a track comprising two spaced members received in said openings to support said carriage for movement toward and away from said medium; a support member for said carriage having a pair of spaced ears on opposite sides of said carriage and having elongated slots extending in direction transverse to the direction of movement of said carriage towards and away from said medium; a pair of pins mounted in the opposite ends of said carriage to be received in said slots; elements including a rack and pinion adapted to shift said member toward and away from said medium to shift said carriage along said track; and mechanism operable to shift said track in the axial direction relative to said one hub uniformly to distribute said medium across said hub as it is wound thereon.

5. The combination in a magnetic recorder of a pair of spaced spool-receiving hubs to engage spools between which a lengthy record medium extends; a first wheel disposed between said hubs and spaced from said medium; a retractible carriage including a second wheel movable to a first position free of said medium and to a second position in engagement with said medium to press said medium against said first wheel; an electromagnetic transducer head carried by said carriage, said head being operably positioned to receive said medium when said second wheel is moved into engagement with said medium, drive elements selectively operable to rotate one of said hubs and one of said wheels to impart winding movements to said medium, and means interconnecting said retractible carriage and said drive elements to wind said medium when said second wheel engages said first wheel.

6. The combination in a magnetic recorder of a pair of spaced spool-receiving hubs to engage spools between which a lengthy record medium extends; a first wheel disposed between said hubs and spaced from said medium; a retractable carriage including a second wheel movable to a first position free of said medium, a second position free of said medium, and a third position in engagement with said medium to press said medium against said first wheel; an electromagnetic transducer head carried by said carriage, said head being operably positioned to receive said medium when said second wheel is moved into engagement with said medium, drive elements operable in a first position to rotate one of said hubs and one of said wheels to impart winding movements to said medium, in a second condition to release said hubs, and in a third condition to rotate the other of said hubs to impart rewinding movements to said medium; and mechanism interconnecting said retractable carriage and said drive elements to wind said medium when said retractable carriage is in said third position, to release said medium when said retractable carriage is in said second position, and to rewind said medium when said retractable carriage is in said first position.

7. The combination in a magnetic recorder of a pair of spaced spool-receiving hubs to engage spools between which a lengthy record medium extends; a first wheel disposed between said hubs and spaced from said medium; a retractible carriage including a second wheel movable to a first position free of said medium, a second position free of said medium, and a third position in engagement with said medium to press said medium against said first wheel; an electromagnetic transducer head carried by said carriage, said head being operably positioned to receive said medium when said second wheel is moved into engagement with said medium, drive elements operable in a first condition to rotate one of said hubs and one of said wheels to impart winding movements to said medium, in a second condition to release said hubs, and in a third condition to rotate the other of said hubs to impart rewinding movements to said medium; and means operable to urge said drive elements from said third condition to said second condition.

8. The combination in a magnetic recorder of a pair of spaced spool-receiving hubs to engage spools between which a lengthy record medium extends; a first wheel mounted in spaced relation with said medium; a head; a carriage shiftable relative to said hubs to support said head; elements including a second wheel supported on said carriage for retracting movements toward and away from said medium selectively to press said medium against said first wheel; means to rotate one of said wheels to impart velocity to said medium and wind said medium on one of said spools.

9. The combination in a magnetic recorder of a pair of spaced spool-receiving hubs to engage spools between which a magnetic recording medium extends; mechanism to impart take-up rotation to one of said hubs to cause said medium to be wound on the spool engaged thereby; an electromagnetic transducer head; a carriage to support said head in spaced relationship to said medium as it extends between said spools; mechanism operable in accord with rotation of said one hub to shift said carriage in the axial direction relative to the spool engaged by said hub uniformly to distribute said medium across said spool as it is wound thereon; and means including elements carried by said carriage and engageable with said medium over the entire range of shift of said head operable to press said medium against said head.

10. The combination in a magnetic recorder of a pair of spaced spool-receiving hubs to engage spools between which a lengthy record medium extends; a first wheel mounted in spaced relation with said medium; a head; a carriage shiftable relative to said hubs to support said head; elements including a second wheel supported on said carriage for retracting movement toward and away from said medium selectively to press said medium against said first wheel; means to rotate one of said wheels to impart velocity to said medium and wind said medium on one of said spools; and mechanism operable to distribute said medium axially of said one spool.

11. The combination in a magnetic recorder of a pair of spaced spool-receiving hubs to engage spools between which a lengthy record medium extends; a first wheel mounted in spaced relation with said medium; a head; a carriage shiftable relative to said hubs to support said head; elements including a second wheel supported on said carriage for retracting movement toward and away from said first wheel; means to rotate one of said wheels to impart velocity to said medium and wind said medium on one of said spools; and mechanism operable to distribute said medium axially of said one spool, said last mentioned mechanism including means operable to shift elements carried by said carriage in an axial direction relative to said hubs.

12. In a magnetic recorder device a pair of spaced apart rotatable spool-receiving mechanisms adapted to rotatably support a pair of spools with a lengthy magnetic record medium extending therebetween through a substantially free and unobstructed path across the magnetic recorder device, a shiftable carriage mechanism, a transducer head carried by said shiftable carriage mechanism, said shiftable carriage mechanism being selectively shiftable to move said transducer head into and out of operative association with said lengthy magnetic record medium, and drive mechanism operable selectively to wind said medium on one of said spools.

13. A magnetic recorder device comprising a magnetic record medium carrying mechanism, a shiftable carriage carrying element disposed to engage a lengthy magnetic record medium carried by said mechanism in one position of said carriage and to be disengaged therefrom in another position of said carriage, and a transducer head disposed on the recorder device to be operatively associated with said lengthy magnetic record medium in said one position of said carriage and to be dissociated therefrom in another position of said carriage, the several parts of the magnetic recorder device being so disposed on said device as to provide a substantially free path for the record medium when said carriage is in said other position, the path of said lengthy magnetic record medium being distorted when said carriage is in said one position.

14. A magnetic recorder device comprising a magnetic record medium carrying mechanism including a pair of spaced apart rotatable spool-receiving mechanisms, a shiftable carriage carrying elements disposed to engage a lengthy magnetic record medium carried by said mechanism in one position of said carriage and to be disengaged therefrom in another position of said carriage, said shiftable carriage being disposed between said spool-receiving mechanisms and a transducer head disposed on the recorder device to be operatively associated with said lengthy magnetic record medium in said one position of said carriage and to be dissociated therefrom in another position of said carriage and disposed substantially between said spool-receiving mechanisms, the several parts of said magnetic recorder device being so disposed on said device as to provide a substantially straight line free path for the record medium when said carriage is in said other position, the path of said lengthy magnetic record medium being distorted from a straight line when said carriage is in said one position.

MARVIN CAMRAS.

References Cited in the file of this patent

UNITED STATES PATENTS

| Number | Name | Date |
|---|---|---|
| 1,123,147 | Sherman | Dec. 29, 1914 |
| 1,883,560 | Chipman | Oct. 18, 1932 |
| 1,993,735 | Foster et al. | Mar. 12, 1935 |
| 2,051,788 | Foster et al. | Aug. 18, 1936 |
| 2,122,485 | Nelson | July 5, 1938 |
| 2,364,556 | Somers | Dec. 5, 1944 |
| 2,408,320 | Kuhlik | Sept. 24, 1946 |
| 2,467,507 | Stone | Apr. 19, 1949 |
| 2,500,903 | Neff | Mar. 14, 1950 |
| 2,501,573 | McLouth et al. | Mar. 21, 1950 |
| 2,620,404 | Pond | Dec. 2, 1952 |

FOREIGN PATENTS

| Number | Country | Date |
|---|---|---|
| 4,933 | Australia | Nov. 26, 1926 |
| 459,035 | Great Britain | Dec. 31, 1936 |